US008589543B2

(12) United States Patent
Dutta et al.

(10) Patent No.: US 8,589,543 B2
(45) Date of Patent: Nov. 19, 2013

(54) VIRTUAL DATA CENTER MONITORING

(75) Inventors: Debojyoti Dutta, Santa Clara, CA (US); Subrata Banerjee, Los Altos, CA (US); Sanjay Kumar Agrawal, San Jose, CA (US); Robert H. Starmer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 13/174,946

(22) Filed: Jul. 1, 2011

(65) Prior Publication Data

US 2013/0007261 A1  Jan. 3, 2013

(51) Int. Cl.
*G06F 15/173* (2006.01)

(52) U.S. Cl.
USPC ........................................................ 709/224

(58) Field of Classification Search
None
See application file for complete search history.

(56) References Cited

U.S. PATENT DOCUMENTS

| | | | | |
|---|---|---|---|---|
| 5,666,114 A | * | 9/1997 | Brodie et al. | 341/50 |
| 7,284,041 B2 | * | 10/2007 | Nakatani et al. | 709/219 |
| 7,734,576 B2 | * | 6/2010 | Simon et al. | 707/602 |
| 7,953,621 B2 | * | 5/2011 | Fama et al. | 705/7.15 |
| 8,013,861 B2 | * | 9/2011 | Hamilton et al. | 345/473 |
| 8,127,297 B2 | * | 2/2012 | Hamilton et al. | 718/104 |
| 8,135,362 B2 | * | 3/2012 | LaDue | 455/126 |
| 8,214,750 B2 | * | 7/2012 | Hamilton et al. | 715/757 |
| 8,327,376 B2 | * | 12/2012 | Hamilton et al. | 718/104 |
| 8,341,640 B2 | * | 12/2012 | Hamilton et al. | 718/104 |

OTHER PUBLICATIONS

Position Paper: Service Clouds as Future Internet Service Offers, Draft 1.1—Jan. 16, 2009, pp. 1-3.
http://aws.amazon.com/vcp/faqs, "Amazon Virtual Private Cloud FAQs", Jun. 24, 2011, pp. 1-8.

* cited by examiner

*Primary Examiner* — Tammy Nguyen
(74) *Attorney, Agent, or Firm* — Edell, Shapiro & Finnan, LLC (57) ABSTRACT

Techniques are provided for monitoring the state or status of virtual data centers. In one embodiment, a method includes receiving state information representing the state of hardware devices supporting instantiations of virtual data centers operating within a physical data center. The state information is mapped to hardware devices supporting a selected instantiation of a virtual data center to identify state information for the selected instantiation of a virtual data center. An assessment is then made, based on the state information for the selected instantiation of a virtual data center, regarding a degree to which the selected instantiation of a virtual data center is operating in accordance with predetermined policy. A user is then notified of the assessment via, e.g., a color-coded dashboard representation of the selected instantiation of a virtual data center or a color-coded aspect of the selected instantiation of a virtual data center.

19 Claims, 6 Drawing Sheets

Status:
Green: good
Yellow: warning
Red: operational issues

VIRTUAL DATA CENTER MONITORING

TECHNICAL FIELD

The present disclosure relates to cloud computing and related data centers.

BACKGROUND

"Cloud computing" can be defined as Internet-based computing in which shared resources, software and information are provided to client or user computers or other devices on-demand from a pool of resources that are communicatively available via the Internet. Cloud computing is envisioned as a way to democratize access to resources and services, letting users efficiently purchase as many resources as they need and/or can afford. A significant component of cloud computing implementations is the "data center." A data center is a facility used to house computer systems and associated components, such as telecommunications and storage systems. It generally includes redundant or backup power supplies, redundant data communications connections, environmental controls (e.g., air conditioning, fire suppression) and security devices. Thus, a data center provides compute, network and storage functionality supported by a variety of physical elements or hardware devices including, but not limited to, compute, network and storage devices that are assembled, connected and configured to provide the services that a given user might want via the "cloud."

As the demand for cloud services has continued to grow, the notion of a "virtual data center" has emerged. With a virtual data center, rather than dedicating a collection of specific hardware devices to a particular end user, the end user receives services from, perhaps, a dynamically changing collection of hardware devices, or even a portion or parts of given hardware devices that are shared, unknowingly, by another end user. Because of, possible frequent, instantiations and de-instantiations of services on behalf of end users within a data center, precisely which set of hardware devices support a given end user at any given moment might not be readily known.

DESCRIPTION OF EXAMPLE EMBODIMENTS

Overview

Techniques are provided for monitoring the state or status of virtual data centers. In one embodiment, a method includes receiving state information representing the state of hardware devices supporting instantiations of virtual data centers operating within a physical data center. The state information is mapped to hardware devices supporting a selected instantiation of a virtual data center to identify state information for the selected instantiation of a virtual data center. An assessment is then made, based on the state information for the selected instantiation of a virtual data center, regarding a degree to which the selected instantiation of a virtual data center is operating in accordance with predetermined policy. A user is kept apprised of the assessment via, e.g., a color-coded dashboard representation of the selected instantiation of a virtual data center or a color-coded aspect of the selected instantiation of a virtual data center.

EXAMPLE EMBODIMENTS

Figure 1:
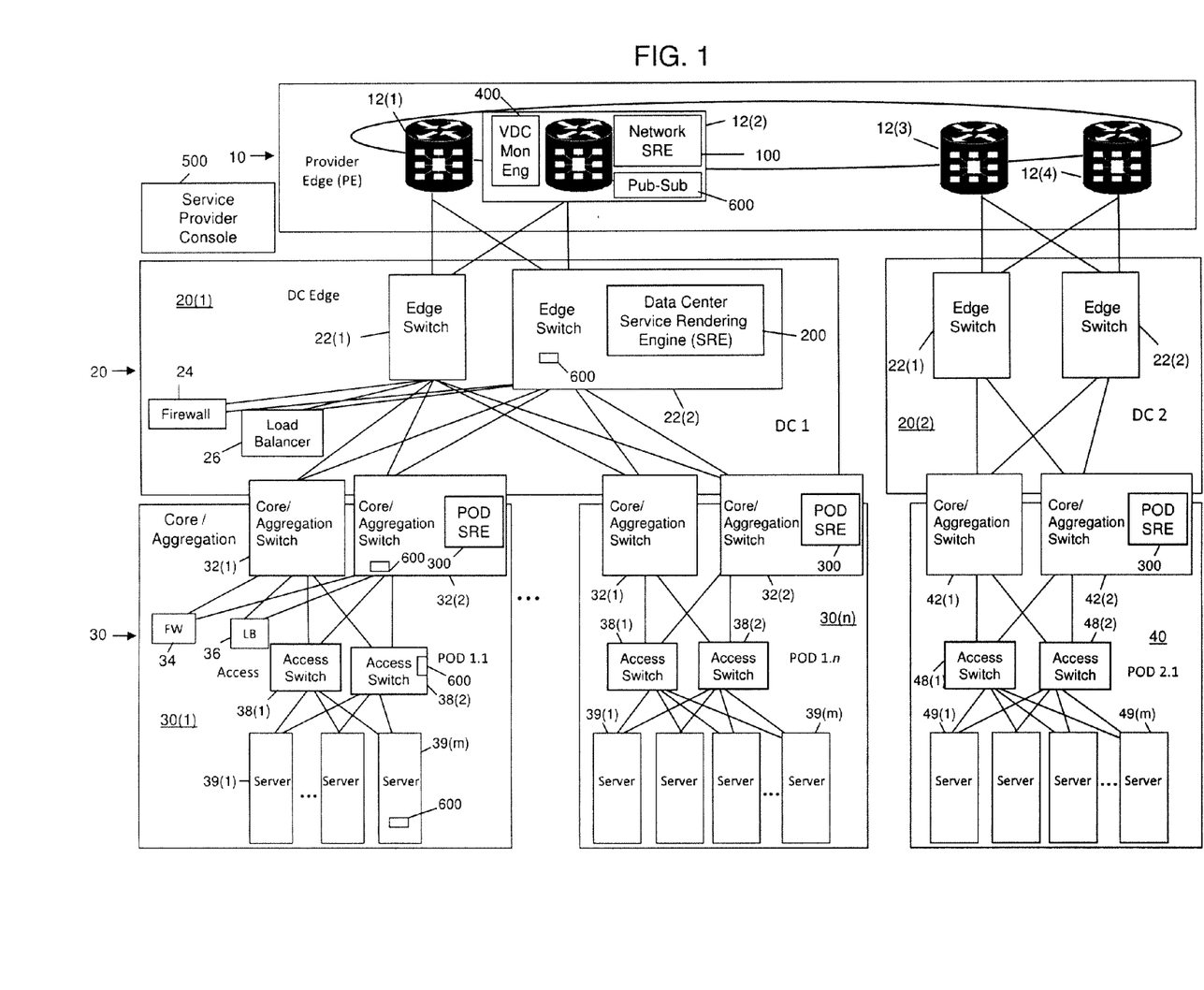
FIG. 1 is an example block diagram of a data center including a virtual data center monitoring engine including state information collection and resource mapping logic used to gather state information about virtual data centers, and aggregation and policy comparison logic used to assess the health or status of a selected virtual data center based on collected state information.

Referring first to FIG. 1, an example of a cloud computing system or environment including multiple data centers is depicted. The system is configured with a distributed hierarchical mechanism for servicing cloud computing service requests. In one possible implementation, the system is operated by a service provider, such as a telecommunications company that serves a plurality of customers.

As shown, the system comprises a plurality of hierarchical levels. The highest level is a network level 10. The next highest level is a data center (DC) level 20. Beneath the data center level 20 is a POD level 30. While FIG. 1 shows three levels in the hierarchy, this is only an example, as there may be additional levels. There are cloud elements, e.g., hardware devices or components, in each hierarchical level. The cloud elements may comprise switches, routers, load balancers, firewalls, servers, network appliance or any hardware device that is involved in providing a function to a cloud service request. For simplicity, the phrases "hardware device," "cloud element" or "component" are meant to encompass any of these devices. In one possible implementation of the cloud computing system shown in FIG. 1, cloud service requests received from end users connected to network level 10 progress through a set of distributed hierarchical service rendering engines (SREs) such that physical resources to fulfill those requests can be effected.

The network level 10 connects multiple different data centers at the data center level 20, e.g., data center 20(1) labeled as DC 1 and data center 20(2) labeled as DC 2, and subsets of the data centers called "PODs" that are centered on aggregation switches within the data center. Again, the number of levels shown in FIG. 1 is an example. It is possible to deploy an arbitrary number of levels of hierarchy, possibly with different definitions than in this example. The hierarchy may follow the physical topology of the network but it is not required.

At each level of the hierarchy, there is at least one service rendering engine. In the network level 10, there are Provider Edge (PE) devices that perform routing and switching functions. FIG. 1 shows four PE devices 12(1)-12(4) as an example. A network service rendering engine is shown at 100 as part of the PE 12(2). At the data center level 20, there are edge switches, firewalls and load balancers. For example, in a first data center 20(1) labeled "DC 1" in FIG. 1, there are edge switches 22(1) and 22(2), a firewall device 24 and a load balancer device 26. The PEs 12(1) and 12(2) in the network level 10 are each connected to the edge switches 22(1) and 22(2). A data center service rendering engine (SRE) 200 is part of the edge switch 22(2) in data center 20(1). The data center SRE 300 may be hosted in other networking elements in the data center or in one or more virtual machines running on servers in the data center. In another form, the data center SRE functionality may be distributed across multiple devices in the POD. The edge switches 22(1) and 22(2) are each connected to the firewall device 24 and load balancer device 26. Similarly, in data center 20(2), there are edge switches 22(1) and 22(2), and also a firewall device and a load balancer device. The firewall and load balancer devices in data center 20(2) are not shown in FIG. 1 for simplicity. Switch 22(2) in data center 20(2) includes a data center service rendering engine 200 as well.

At the POD level 30, there are core/aggregation switches, firewalls, load balancers and web/application servers in each POD. The functions of the firewalls, load balancers, etc., may be hosted in a physical chassis or they may be hosted by a virtual machine executed on a computing element, e.g., a server 39, in the POD level 30. PODs 30(1)-30(n), labeled "POD 1.1"-"POD 1.n", are connected to data center 20(1) and POD 40 is connected to data center 20(2). Thus, PODs 30(1)- 30(n) may be viewed as different processing domains with respect to the data center 20(1), and the data center service rendering engine 200 in the edge switch 22(2) may select which one (or more) of a plurality of processing domains in the POD level to be used for aspects of a cloud service request that the data center service rendering engine 200 receives. Data center 20(2) cannot select one of the PODs 30(1)-30(n) because they are in different processing domains, but data center 20(2) can select POD 40. In each of PODs 30(1)-30(n), there are core/aggregation switches 32(1) and 32(2), one or more firewall (FW) devices 34, one or more load balancer (LB) devices 36, access switches 38(1) and 38(2) and servers 39(1)-39(m). The firewall and load balancers are not shown in POD 30(n) for simplicity. Each server 39(1)-39(m) runs one or more virtual machine processes, i.e., virtual servers, which support instantiations of virtual data centers. There is a POD SRE 300 in core/aggregation switch 32(2) in each of PODs 30(1)-30(n). The POD SRE 300 may be hosted in other networking elements in the POD or in one or more virtual machines running on servers in the POD. In another form, the POD SRE functionality may be distributed across multiple devices in the POD. Similarly, in POD 40 there are core/aggregation switches 42(1) and 42(2), access switches 48(1) and 48(2) and servers 49(1)-49(m). There is a POD service rendering engine 300 in core/aggregation switch 42(2). POD 40 also includes one or more firewalls and load balancers but they are omitted in FIG. 1 for simplicity.

When an end user request for cloud computing services that is supportable by the data centers is received, that request may be first handled by SRE 100 at the network level 10. Allocation of services may then be handled hierarchically in each level of the hierarchy below the network level 10 to fulfill the service request. That is, SRE 100 may communicate with a SRE 200 in the data center level 20 (or directly with hardware devices in the data center level 20), which, in turn, might communicate with SRE 300 in the POD level 30. At the data center level 20 and the POD level 30, the actual network, compute and storage services are allocated to the requested service using selected hardware devices in the overall data center. Often times, requested services may be singular requests for services that might not need allocation of hardware devices for an appreciable amount of time. On the other hand, some user requests are effectively equivalent to a request for longstanding services of a data center. Rather than allocating or dedicating an entire physical POD or data center in response to such a request, a service provider might instead instantiate a "virtual data center" in response to such a request. A virtual data center comprises virtual links between virtual machines and other service elements such as load balancers and firewalls. From the perspective of a given user, a virtual data center appears as a physically dedicated data center, when in fact the services being rendered are provided by portions of a given physical data center, or even portions of multiple physical data centers.

While a service provider may not necessarily need to know precisely which hardware devices have been allocated to support a given virtual data center, the service provider may nevertheless want to know the status of the virtual machines and connections that support the services being supported on behalf of the service provider's customers. To enable the service provider to obtain such status information, several additional components are now described, still with reference to FIG. 1.

At the network level 10, a virtual data center (VDC) monitoring engine 400 is provided. Although shown as associated with one of the provider edge routers 12, the VDC monitoring engine may be a stand alone device, may be associated with another component in the infrastructure shown, or the functionality thereof may be distributed among several components in the cloud. A main function of the VDC monitoring engine 400 is to collect state information about the several components of the physical data centers, map the components to aspects of the virtual data centers that have been instantiated, aggregate the state information associated with a selected virtual data center instantiation, and then assess, based on policy considerations (e.g., service level agreements), a degree to which the selected instantiation of a virtual data center is operating in accordance with the policy considerations. The result of this assessment may then be presented to a service provider or some other user in the form of, e.g., a dashboard display so that the viewer of the display can quickly gain insight into the status or health of a given virtual data center. The dashboard display may be presented via a service provider console 500, which may be a network connected computer that is configured to communicate with VDC monitoring engine 400 to receive data sufficient to render an appropriate display. For example, the service provider console 500 could be a browser that is configured to connect with a web server operating in connection with VDC monitoring engine 400. A dashboard is described in connection with FIG. 6.

In one possible implementation, the state information is collected via a publish-subscribe mechanism supported by publish-subscribe clients and/or servers ("modules") 600 operating on respective hardware devices operating within the physical data center. Thus, as shown in FIG. 1, Provider Edge 12(2) includes a publish-subscribe module 600 that subscribes to state information that is being published by, e.g., the publish-subscribe modules 600 in each of the edge switches 22, core/aggregation switches 32, access switches 38 and servers 39. Although not specifically shown, the several firewalls and load balancers may also include publish-subscribe modules configured to publish state information about those particular components. Those skilled in the art will appreciate that a separate publish-subscriber server can be set up to operate anywhere in the overall network as long as the publish-subscribe clients can be configured to publish data to that server.

It should also be noted that VDC monitoring engine 400 can also be in communication with the respective service rendering engines 100, 200, 300. As is explained more fully below, the VDC monitoring engine 400 is configured to perform mapping between physical data center devices and selected instantiations of VDCs. Information stored or generated by the SREs may be helpful for this function.

Figure 2:
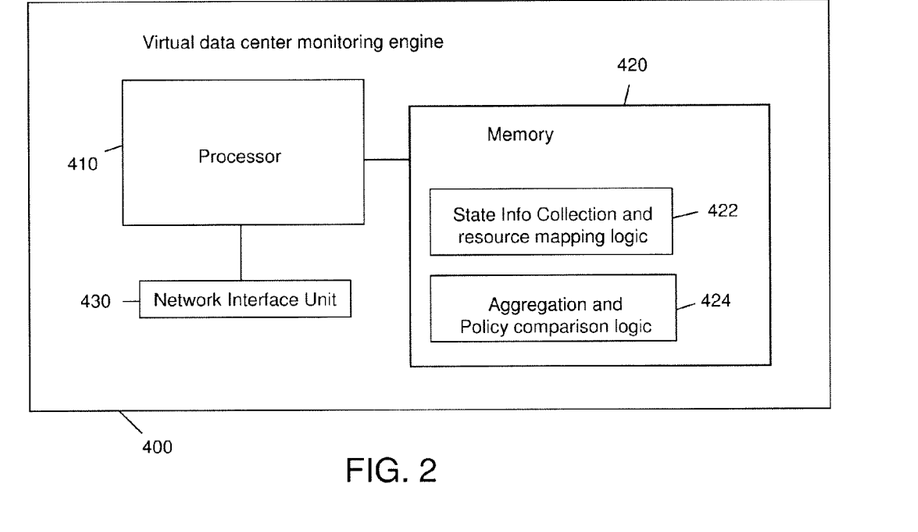
FIG. 2 is an example implementation of the virtual data center monitoring engine.

Reference is now made to FIG. 2, which shows an example implementation of the virtual data center monitoring engine 400. VDC monitoring engine 400 comprises a processor 410, memory 420 and network interface device 430. The memory 420 stores instructions for the VDC monitoring engine 400. The network interface device 430 is configured to perform communications (transmit and receive) over a network in order to communicate with other cloud elements including, e.g., a publish-subscribe modules (and servers, as needed).

The memory 420 is, for example, random access memory (RAM), but may comprise electrically erasable programmable read only memory (EEPROM) or other computer-readable memory in which computer software may be stored or encoded for execution by the processor 410. The processor 410 is configured to execute instructions stored in associated memories for carrying out the techniques described herein. In particular, the processor 410 is configured to execute program logic instructions (i.e., software) stored or encoded in memory 420.

The operations of processors 410 may be implemented by logic encoded in one or more tangible media (e.g., embedded logic such as an application specific integrated circuit, digital signal processor instructions, software that is executed by a processor, etc.). The functionality of VDC monitoring engine 400 may take any of a variety of forms, so as to be encoded in one or more tangible media for execution, such as fixed logic or programmable logic (e.g. software/computer instructions executed by a processor) and the processor 410 may be an application specific integrated circuit (ASIC) that comprises fixed digital logic, or a combination thereof. For example, the processor 410 may be embodied by digital logic gates in a fixed or programmable digital logic integrated circuit, which digital logic gates are configured to perform the operations of the VDC monitoring engine 400. In one form, the functionality of VDC monitoring engine 400 is embodied in a processor or computer-readable memory medium (memory 420) that is encoded with instructions for execution by a processor (e.g., processor 410) that, when executed by the processor, are operable to cause the processor to perform the operations described herein in connection with VDC monitoring engine 400.

In one embodiment, memory 420 includes several sets of logic 422, 424, although the sets of logic may be distributed or combined in different ways. Specifically, as shown in FIG. 2, memory 420 includes state information collection and resource mapping logic 422, along with aggregation and policy comparison logic 424.

State information collection and resource mapping logic 422 is responsible, at a high level, for managing the collection of state information from respective hardware devices throughout the physical data centers and mapping virtual services and connections for a selected instantiation of a virtual data center to the physical hardware devices and network connections that are actually supporting that instantiation.

With the state information in hand, and a mapping between given devices/connections and selected instantiations of virtual data centers established, aggregation and policy comparison logic 424 then aggregates or correlates the state information for a selected instantiation of a virtual data center and compares that aggregation of state information to a set of policies, which may be based on, e.g., service level agreements (SLAs). The results of the comparison, or assessment, may then be transformed into a graphical display for, e.g., a service provider, to view. The functionality of a virtual data center may be implemented with multiple physical components. Thus, for example, a single virtual network connection might, in fact, be made up of multiple physical connections. The mapping functionality maps the multiple physical connections such that in aggregate, the operation of the virtual connection can be effectively monitored.

Consider several virtual data centers that are to be monitored. For each VDC resource (e.g., supporting hardware device, network connection, etc.) probes can be created that measure information regarding the health of the resource. Such probes can be created, for example, at the time the service rendering engines 100, 200, 300 perform their tasks of allocating specific components within the physical data center infrastructure. The probes can be configured to capture "primitives" associated with the supporting hardware devices, network connections, etc. For example, primitives associated with a given network connection may include available bandwidth, delay between nodes and jitter. Primitives associated with compute services might include available memory, processor speed and input/output speed. Primitives associated with storage resources can include capacity or availability, or a state of synchronized redundancy (i.e., to what extent has data been backed up via a redundant storage mechanism).

The probes themselves may take the form of software or a message that is provided to or addressed to a given hardware device, and which may subsequently become resident on the given hardware device, in communication with an operating system thereof, or perhaps resident on a network interface card. The probes are configured to capture the primitives of interest and periodically return them to the VDC monitoring system 400 via, e.g., a publish-subscribe channel.

As a result of the hierarchical nature of the cloud computing system shown in FIG. 1, the probes may "trickle down" the hierarchy to the ultimate hardware device for which it is intended. The dispatch of the probes may be performed during resource allocation time, as mentioned.

When resources for a new virtual data center are being allocated, a mapping between a given VDC resource to one or several physical resources is generated. A resulting map is then stored. When the virtual data center is activated (instantiated) the probes that were previously dispatched can also be activated. The individual probes return "point" data with respect to small pieces of an overall VDC. This point data, representing predetermined primitives, is received and then aggregated and/or correlated on a per VDC basis, since, as mentioned, a given hardware device or physical network connection may support multiple different VDCs.

Figure 3:
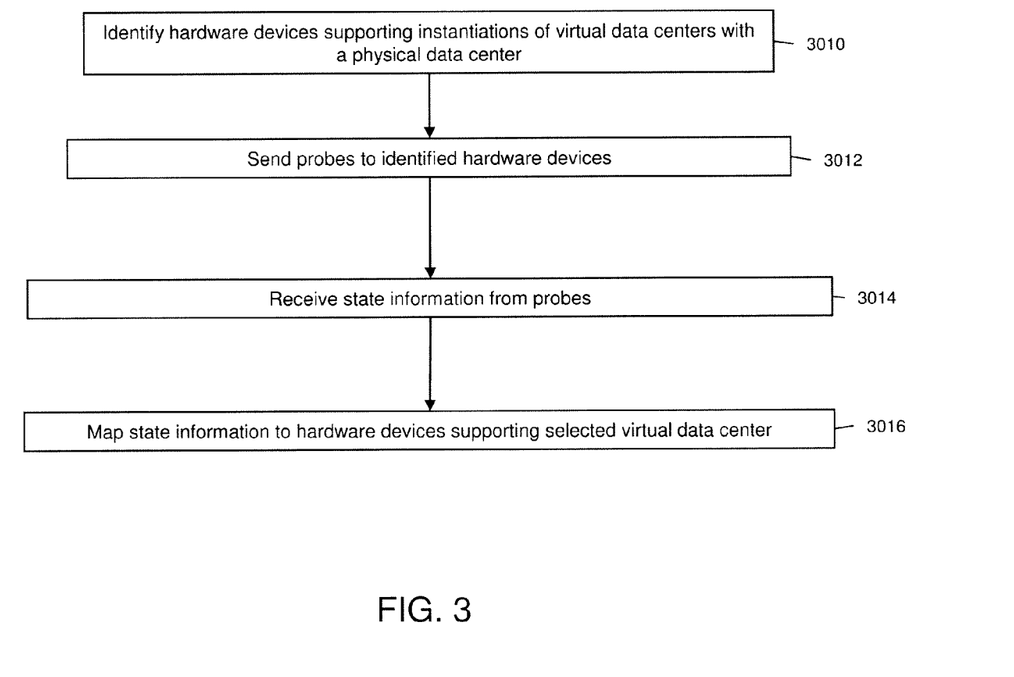
FIG. 3 is an example of a generalized flow chart depicting operations performed by the state information collection and resource mapping logic.

Reference is now made to FIG. 3, which shows an example of a generalized flow chart depicting operations performed by the state information collection and resource mapping logic 422. At step (or process) 3010 hardware devices in a physical data center environment that support instantiations of virtual data centers are identified. For instance, it may be the case that selected hardware devices within a data center are configured to be dedicated for use by specific end users or service providers. As such, those devices may never end up being used as part of a virtual data center. Consequently, as part of an overall solution to monitoring virtual data centers, there may not be any need to monitor those selected hardware devices.

At step 3012, probes are sent to the identified hardware devices. As mentioned, these probes may be composed of a message or set of software instructions that are configured to provide state information from each of the hardware devices on which the probes are deployed. The state information may be in the form of primitives that provide point data regarding the status or health of the hardware device, a network connection supported by that hardware device, or any other operational data that can be used to assess the state of the hardware device.

At step 3014, the state information collected by the probes is received. The state information may be received at, e.g., virtual data center monitoring engine 400 via a publish subscribe mechanism. That is, the probes may be configured to communicate with a publish subscribe server that is instantiated somewhere in the overall cloud computing network, and which can be accessed by the probes and the virtual data center monitoring system 400, the latter of which has subscribed to the state information publications by the respective probes.

At step 3016, the received state information is mapped to hardware devices supporting a selected virtual data center instantiation. That is, the probes send state information data from hardware devices to the VDC monitoring engine 400, but the probes do not necessarily know that the hardware device that it is presently monitoring is part of one or multiple VDCs. As a result, a mapping is performed between the hardware devices about which state information is being gleaned and VDCs that have been instantiated using those hardware devices.

Figure 4:
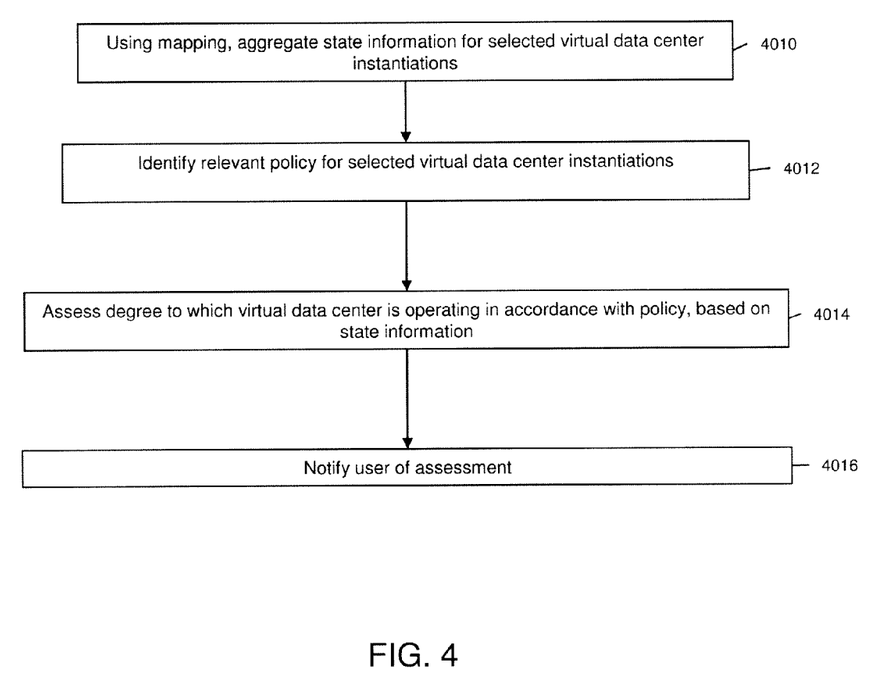
FIG. 4 is an example of a generalized flow chart depicting operations performed by the aggregation and policy comparison logic.

Reference is now made to FIG. 4, which depicts an example of a generalized flow chart of operations performed by the aggregation and policy comparison logic 424. At step 4010, using the mapping information generated by, e.g., the state information collection and mapping logic 422, state data for a selected virtual data center instantiation is aggregated. In other words, all of the state data that is relevant to a given VDC instantiation is collected by, e.g., copying all such relevant state data to its own memory space, by flagging the relevant data where the data is stored, or by any other means by which the relevant data can be identified for purposes of further processing.

At step 4012, relevant policy is identified for the selected virtual data center instantiation. The policy may be in the form of a service level agreement (SLA) that was previously negotiated between, e.g., an end user and a service provider. The policy may include such requirements as minimum available bandwidth for connectivity to a web server, processor speed, maximum latency, maximum jitter and packet-loss (voice/video) systems, locality (client-service provider locality, and datacenter affinity or negative affinity), storage performance, minimum I/O capability, minimum disk space overhead, central processing unit (CPU) load, memory headroom availability, I/O headroom availability (memory bus, storage, network), among other possibilities.

At step 4014, a degree to which the virtual data center is operating in accordance with the identified policy is assessed. Assessment may be made by comparing raw state information with a given policy, comparing an aggregated set of state information with the given policy, or comparing against a weighted distribution of aggregated state information. Comparison may be performed via inequalities. For example, if a given policy requires that a web server be able to support X number of requests in parallel, then assuming the web server is instantiated in the virtual data center by multiple web servers, then it may be determined whether the aggregate capacity of the multiple web servers is less than, equal to, or greater than the specified requirement.

In some instances, it may be desirable to weight the results of several assessments. For example, even if a level of bandwidth might not be currently supported in accordance with a given policy requirement, the fact that a web server has never been overloaded might indicate that while not every aspect of a policy is being followed, the functional operation of the virtual data center has not been compromised.

Once assessments are made, an overall assessment may be presented, at step 4016, to a user of the VDC monitoring engine 400.

Figure 5:
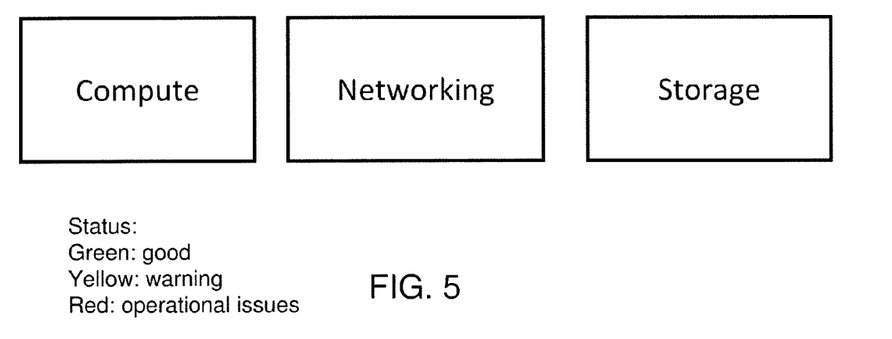
FIGS. 5 and 6 are example display presentations in the form of a dashboard that present a quick overview of the status of service providers' virtual data centers.

FIG. 5 is an example display presentation of a display in the form of a dashboard that can present a quick overview of the status of a service provider's virtual data centers. This display might be presented as a high level view wherein the services (e.g., compute, networking, and storage) of a given virtual data center, or an aggregation of several virtual data centers, are each depicted as a color-coded shape where the status might be green for good, yellow for warning, or red for issues affecting some minimum operational requirements (again, as compared to a predetermined policy, such as an SLA).

Figure 6:
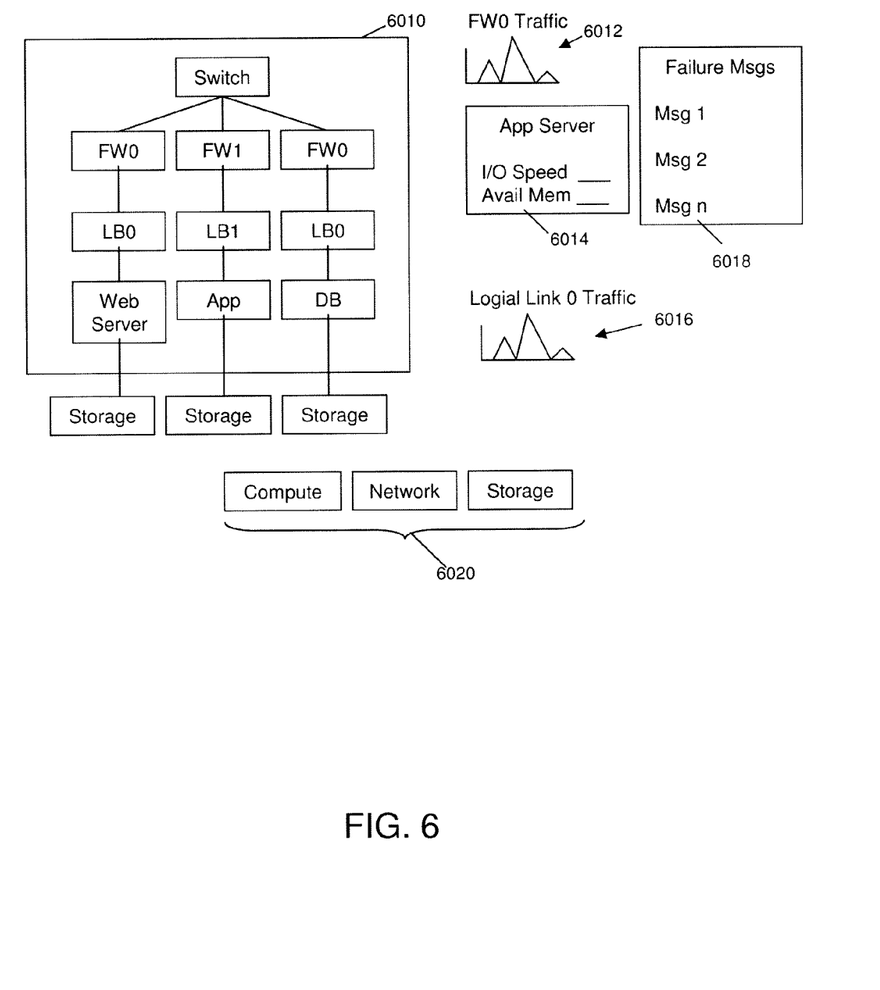

A more sophisticated user display or dashboard is shown in FIG. 6. That figure shows a logical hierarchy of a virtual data center 6010 including switches, firewalls, load balancers, web, application and database servers and storage devices. Components are individually labeled, such as FW0 for firewall 0, and LB0 for load balancer 0, which are in communication with a web server. Of course, the components shown in the graphic of virtual data center 6010 do not correspond to physical devices. Rather, the graphic represents an instantiation of a virtual data center that is, instead supported by physical devices, but those physical devices need not be evident to, e.g., a service provider. The connection between, e.g., the switch at the top of the hierarchy and the web server may represent a given logical link, in this case Logical Link 0.

Other similar components, including FW1, LB1, along with an application server and associated storage, and FW2, LB2, along with a database server, and associated storage are shown in the graphic. Also shown in FIG. 6 are several additional graphics that can be present at all times, or can be selected for viewing by, e.g., selecting one of the components or links that are depicted in hierarchy 6010. Specifically, a traffic graphic 6012 may be presented for any of nodes or hardware devices in the hierarchy 6010. Graphic 6012 shows traffic over some period of time, for example.

Graphic 6014 can present statistics regarding, e.g., an application server. It is noted that the statistics shown have to do with the operation of the server, and not necessarily the application that is being run on the server. This may be desirable, since the application itself, or data being processed by the application may not be accessible to a service provider. For instance, the application or data may include HIPPA (Health Insurance Portability and Accountability Act) protected information. Thus, the VDC monitoring engine might never gain access to such data. The information in graphic 6014 might, accordingly, focus on server operations.

Graphic 6016 presents data on a given Logical Link, in this case Logical Link 0. Graphic 6018 might include failure or alert messages that might be of interest to a service provider that is monitoring its virtual data centers. Graphic 6020, like FIG. 5, may be included to the extent space permits and the user still wants to see an overall indication, status or health of one or more virtual data centers.

Individual elements or links in graphic hierarchy 6010 can also be displayed in a color-coded fashion. In other words, the graphic may display a color-coded representation of the selected instantiation of a virtual data center or a color-coded aspect of the selected instantiation of a virtual data center. Finally, using the available mapping information, the VDC monitoring engine 400 can also identify corresponding physical locations of hardware devices on which faults have been detected. The relevant physical equipment can then be displayed, although for a service provider that might not have access to the physical equipment, such information may be of marginal use. On the other hand, the service provider might be able to quickly relay information about specific hardware devices to appropriate personnel.

The above description is intended by way of example only.

What is claimed is:

1. A method comprising:
receiving state information representing the state of hardware devices supporting instantiations of virtual data centers operating within a physical data center;
mapping the state information to hardware devices supporting a selected instantiation of a virtual data center to identify state information for the selected instantiation of a virtual data center;
assessing, based on the state information for the selected instantiation of a virtual data center, a degree to which the selected instantiation of a virtual data center is operating in accordance with predetermined policy; and
notifying a user of a status of the selected instantiation of a virtual data center based on the degree to which the selected instantiation of a virtual data center is operating in accordance with predetermined policy,
wherein receiving state information comprises receiving state information from a plurality of probes, the state information being indicative of at least one of amount of storage in a storage hardware device or status of synchronized redundancy of data stored on the storage hardware device.

2. The method of claim 1, further comprising deploying the plurality of probes each configured to measure a state of respective hardware devices supporting the instantiations of virtual data centers, and receiving the state information from the plurality of probes so deployed.

3. The method of claim 2, further comprising configuring the plurality probes such that the probes are passed through hierarchical levels of the physical data center to hardware devices supporting the instantiations of virtual data centers.

4. The method of claim 1, wherein receiving state information from the plurality of probes comprises receiving the state information via a publish-subscribe mechanism operating within the physical data center.

5. The method of claim 1, wherein receiving state information from the plurality of probes comprises receiving state information indicative of at least one of available bandwidth for a given link between a first hardware device and a second hardware device, delay in communication from a first hardware device to a second hardware device or jitter.

6. The method of claim 1, wherein receiving state information from the plurality of probes comprises receiving state information indicative of at least one of available computer memory, computer processor speed or compute input/output speed.

7. The method of claim 1, wherein assessing a degree to which the selected instantiation of a virtual data center is operating in accordance with predetermined policy comprises comparing elements of the predetermined policy to selected state information for the selected instantiation of a virtual data center.

8. The method of claim 1, wherein notifying a user of a status of the selected instantiation of a virtual data center comprises displaying a color-coded representation of the selected instantiation of a virtual data center or a color-coded aspect of the selected instantiation of a virtual data center.

9. The method of claim 8, wherein notifying a user of a status of the selected instantiation of a virtual data center comprises displaying or highlighting the representation of the selected instantiation of a virtual data center or a color-coded aspect of the selected instantiation of a virtual data center in a color of green, yellow or red.

10. The method of claim 1, further comprising identifying a logical and corresponding physical location of a fault based on the state information.

11. A computer-readable storage device storing instructions that, when executed by a processor, cause the processor to:
receive state information representing the state of hardware devices supporting instantiations of virtual data centers operating within a physical data center;
map the state information to hardware devices supporting a selected instantiation of a virtual data center to identify state information for the selected instantiation of a virtual data center;
assess, based on the state information for the selected instantiation of a virtual data center, a degree to which the selected instantiation of a virtual data center is operating in accordance with predetermined policy; and
notify a user of a status of the selected instantiation of a virtual data center based on the degree to which the selected instantiation of a virtual data center is operating in accordance with predetermined policy,
wherein receiving state information comprises receiving state information from a plurality of probes, the state information being indicative of at least one of amount of storage in a storage hardware device or status of synchronized redundancy of data stored on the storage hardware device.

12. The computer-readable storage device of claim 11, wherein the instructions that cause the processor to receive state information cause the processor to receive the state information via a publish-subscribe mechanism operating within the physical data center.

13. The computer-readable storage device of claim 11, wherein the instructions that cause the processor to receive state information cause the processor to receive state information indicative of at least one of available bandwidth for a given link between a first hardware device and a second hardware device, delay in communication from a first hardware device to a second hardware device or jitter.

14. The computer-readable storage device of claim 11, wherein the instructions that cause the processor to receive state information cause the processor to receive state information indicative of at least one of available computer memory, computer processor speed or compute input/output speed.

15. The computer-readable storage device of claim 11, wherein the instructions that cause the processor to assess a degree to which the selected instantiation of a virtual data center is operating in accordance with predetermined policy cause the processor to compare elements of the predetermined policy to selected state information for the selected instantiation of a virtual data center.

16. An apparatus comprising:
a network interface unit configured to perform communications over a network;
a processor configured to be coupled to the network interface unit, wherein the processor is configured to:
receive via the network interface unit state information representing the state of hardware devices supporting instantiations of virtual data centers operating within a physical data center;

map the state information to hardware devices supporting a selected instantiation of a virtual data center to identify state information for the selected instantiation of a virtual data center;

assess, based on the state information for the selected instantiation of a virtual data center, a degree to which the selected instantiation of a virtual data center is operating in accordance with predetermined policy; and notify a user, via the network interface unit, of a status of the selected instantiation of a virtual data center based on the degree to which the selected instantiation of a virtual data center is operating in accordance with predetermined policy, wherein receiving state information comprises receiving state information from a plurality of probes, the state information being indicative of at least one of amount of storage in a storage hardware device or status of synchronized redundancy of data stored on the storage hardware device.

17. The apparatus of claim 16, wherein the processor is configured to receive the state information via a publish-subscribe mechanism operating within the physical data center.

18. The apparatus of claim 16, wherein the processor is configured to receive state information indicative of at least one of available bandwidth for a given link between a first hardware device and a second hardware device, delay in communication from a first hardware device to a second hardware device or jitter.

19. The apparatus of claim 16, wherein the processor is configured to compare elements of the predetermined policy to selected state information for the selected instantiation of a virtual data center.

* * * * *